United States Patent [19]
DeMello

[11] Patent Number: 5,997,320
[45] Date of Patent: Dec. 7, 1999

[54] TRAILER LIGHT HARNESS STORAGE AND PROTECTOR CADDY

[76] Inventor: Dana A. DeMello, 1817 E. Linwood Rd., Linwood, Mich. 48634

[21] Appl. No.: 09/022,042

[22] Filed: Feb. 11, 1998

[51] Int. Cl.[6] .................................................. H01R 13/44
[52] U.S. Cl. ............................. 439/148; 439/528; 439/35
[58] Field of Search ............................. 439/528, 35, 135, 439/148

[56] References Cited

U.S. PATENT DOCUMENTS

| | | | |
|---|---|---|---|
| 2,428,323 | 9/1947 | Winer | 171/77 |
| 2,729,797 | 1/1956 | Kobler et al. | 339/36 |
| 3,182,280 | 5/1965 | Daut et al. | 339/66 |
| 4,258,970 | 3/1981 | Bourdon et al. | 439/148 |
| 4,396,245 | 8/1983 | Lane | 339/38 |
| 4,600,261 | 7/1986 | Debbaut | 339/116 C |
| 4,738,641 | 4/1988 | Eversole, Jr. | 439/528 |
| 4,740,169 | 4/1988 | Gordon | 439/148 |
| 4,940,427 | 7/1990 | Pearson | 439/501 |
| 5,380,209 | 1/1995 | Converse, Jr. et al. | 439/35 |
| 5,514,009 | 5/1996 | Hughes | 439/35 |

*Primary Examiner*—Neil Abrams
*Assistant Examiner*—Hae Moon Hyeon
*Attorney, Agent, or Firm*—John J. Swartz

[57] ABSTRACT

A storage caddy for storing a terminal end connector of a trailer light wiring harness including an electrically nonconductive base having a female receptacle therein and a laterally adjacent, elongate, male dummy plug for receiving complementally formed, electrically conductive, male and female electrical terminals, respectively, provided in the terminal end connector. Mechanism is provided for mounting the electrically nonconductive base on a vehicle adjacent the terminal end connector.

7 Claims, 3 Drawing Sheets

5,997,320

1

TRAILER LIGHT HARNESS STORAGE AND PROTECTOR CADDY

BACKGROUND OF THE INVENTION

1. Field of the Invention

This invention relates to a device for stowing, and preventing the contamination of, an electrical terminal end connector on a trailer wiring harness and more particularly, to a storage and protector caddy which has electrically nonconductive female sockets and male plugs for mating with complementally formed electrically conductive male terminals and female sockets on the terminal end connector.

2. Description of the Prior Art and Objects

It is conventional to provide electrical power to the lights of a trailer via wiring harnesses on the draft vehicle and the trailer which have mating terminal end connectors that are detachably coupled together. These connectors each have one or more electrically conductive male pin terminals and one or more electrically conductive socket terminals which receive the complementally formed, female and male electrically conductive terminals on the other connector. When the draft vehicle is not coupled to the trailer, and the wiring harnesses are not coupled together, the harnesses are typically left hanging from either the draft vehicle or the trailer and exposed to the elements. Sometimes, dirt, snow and ice fill the electrically conductive socket members and thus, cannot be used until cleaned. This is particularly frustrating to the user. Additionally, the uncoupled connector ends on the draft vehicle and/or trailer will sometimes drag on the ground and become damaged. Accordingly, it is an object of the present invention to provide a new and novel device for preventing dirt, ice and other foreign matter from contaminating the trailer light harness coupling members when not in use.

It is another object of the present invention to provide new and novel dummy receptacles for stowing the disconnected, complementally formed terminal end connectors for a trailer light wiring harness when not in use.

Devices have been provided heretofore for preventing such contamination, such as that disclosed in U.S. Pat. No. 5,380,209 issued to Carroll H. Converse, Jr. et al on Jan. 10, 1995, which includes a hollow storage enclosure in which the terminal end connector can be disposed. A somewhat analogous device is illustrated in U.S. Pat. No. 4,738,641 issued to William F. Eversole, Jr. on Apr. 19, 1988 and U.S. Pat. No. 4,940,427 issued to Linnea H. Pearson on Jul. 10, 1990. The prior art devices have several moving parts which are subject to failure. The prior art devices require substantial manipulation of various moving parts which is cumbersome and time consuming. Accordingly, it is another object of the present invention to provide a one-piece storage caddy for storing and protecting a terminal connector for a trailer harness.

It is still another object of the present invention to provide a storage caddy of the type described which has no moving parts.

Devices, such as that disclosed in U.S. Pat. No. 3,182,280 issued to F. X. Daut et al on May 4, 1965 has been provided for protecting contact pins in electrical connectors. A waterproof cap protector has been provided for protecting an electrical cable connector having a male pin projections such as that disclosed in U.S. Pat. No. 2,428,323 issued to E. Winer on Sep. 30, 1947. The latter two mentioned devices do not have mechanism for concurrently protecting female electrical sockets in such a connector. Accordingly, it is another object of the present invention to provide a trailer light wiring harness storage and protection device which will concurrently, adequately protect and detachably seal both male and female electrical terminals in electrical connectors.

Various other patents which are of interest in demonstrating the state of art, but not disclosing the new and novel construction disclosed and claimed herein, are illustrated in the following cited United States patents:

| U.S. Pat. No. | Patentee | Issue Date |
| --- | --- | --- |
| 2,729,797 | V. Kobler et al | Jan. 3, 1956 |
| 5,514,009 | Hughes | May 7, 1996 |
| 4,396,245 | Lane | Aug. 2, 1983 |

A large number of trailer wiring harnesses include a motor vehicle mounted, four-way, flat harness connector having one male pin and three female socket pins and a complementally formed, trailer mounted female connector including a female socket receptacle and three male pins. There is no known one piece, insulated storage caddy which can be quickly and easily mounted and attached to, and detached from, the trailer wiring harness connectors. Accordingly, it is an object of the present invention to provide a new and novel storage one-piece caddy for protecting and stowing the terminal end connector of an electrical wiring harness.

It is another object of the present invention to provide a storage caddy of the type described including an electrically nonconductive base having an imperforate end face and an axially opposite perforate end face including at least one female socket.

It is another object of the present invention to provide an electrically nonconductive storage caddy of the type described including an electrically nonconductive base having a first socket for receiving an electrically conductive male pin terminal, a second socket adjacent thereto and a plurality of electrically non-conductive male plug members which are integral with the electrically nonconductive storage base and disposed in the second socket for receiving an electrically conductive female terminal.

It is a further object of the present invention to provide a storage caddy of the type described including three laterally adjacent electrically nonconductive sockets in an end face of an electrically nonconductive base member and an electrically nonconductive male plug integral with the base and disposed adjacent the nonconductive sockets.

Other objects and advantages of the present invention will become apparent to those of ordinary skill in the art as the description thereof proceeds.

SUMMARY OF THE INVENTION

A storage and protector caddy for stowing and protecting an electrical terminal end connector of an electrical trailer wiring harness comprising: a storage base of electrically nonconductive material having a mating end provided with at least one pin receiving socket for snugly slidably detachably receiving a male pin terminal on the wiring harness, and an electrically nonconductive male plug member integral with the base and disposed laterally adjacent the pin receiving socket for snugly slidably detachably being received in a female electrical socket terminal on the terminal end connector.

DESCRIPTION OF THE DRAWINGS

The invention may be more readily understood by referring to the accompanying drawings, in which.

DESCRIPTION OF PREFERRED EMBODIMENT

Figure 3:
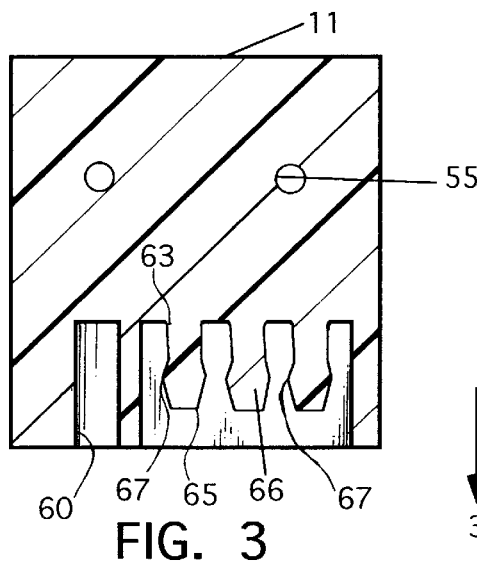
FIG. 3 is a sectional side view of a storage and protector caddy constructed according to the present invention, taken along the section line 3—3 of FIG. 4, for mating with a vehicle mounted, power supply, terminal end connector which is illustrated at the left side of FIG. 2.
Figure 4:
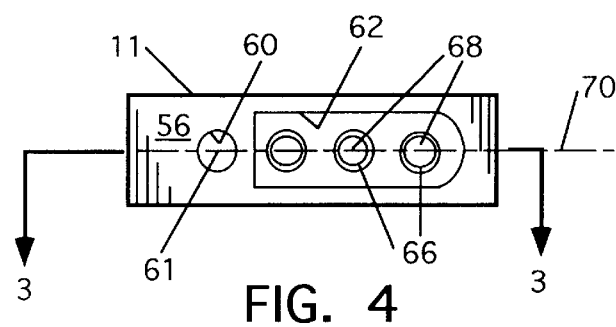
FIG. 4 is an under plan view of the storage and protector caddy illustrated in FIG. 3.

Storage and protector caddies constructed according to the present invention, generally designated 10 (FIGS. 3–5) and 12 (FIG. 6), are particularly adapted for use with a pair of trailer light electrical harness, generally designated 14. The trailer light wiring harness, generally designated 14, includes a power supply trailer light harness, generally designated 16, having a flat, four way terminal end connector 17 mounted on the motor vehicle 18 and a trailer mounted, power receiving trailer light harness, generally designated 20, having a terminal end connector 19 mounted on a trailer (not shown).

The terminal end connector 17 of the power supply harness 16 includes an electrically nonconductive flat housing 22 mounting an electrically conductive elongate male pin terminal 24 coupled to a power supply, not shown, via electrically conductive wires 28 embedded in the housing 22 and an insulated power supply cable 26. The flat terminal housing 22 may suitably comprise a block formed from resin, plastic or rubber material.

A series of three, laterally aligned electrically conductive hollow cylindrical female terminals 30, laterally aligned with the male pin terminal 24, are received in three sockets 31 formed in an end portion 29 of the housing 22. The female end terminals 30 are coupled to a source of power via wires 32, 34 and 36A embedded in the housing 22 and cable 26.

The trailer mounted harness 20 includes a terminal end connector 19 having an electrically nonconductive flat housing 33 provided with an elongate recess 37 receiving an electrically conductive, hollow cylindrical, elongate female socket 36 coupled to a wire 38 (FIG. 6) that is wrapped in a distribution cable 40 which is electrically coupled in circuit with an item to be powered such as a light or a turn signal.

The trailer harness housing 33 includes a perforate end face 35 provided with a socket 42 which receives three electrically conductive male pin terminals 44, 46 and 48 coupled to wires 50, 52 and 54 (FIG. 6) respectively which in turn are embedded in the insulated housing 33 and connected to trailer lights, turn signals, etc. The male pin 24 on the connector 17 is formed complemental to the socket 36 and the male pins 44, 46 and 48 are formed complemental to the cylindrical female socket terminals 30 on connector 17 to provide electrical connection when the connectors 17 and 19 are mated.

The caddy or dummy receptacle 10 constructed according to the present invention for the motor vehicle connector 17 comprises a flat rectangular solid block 11 of electrically nonconductive, electrically insulating material which may suitably comprise a pliable thermoplastic elastomer that is high in natural lubricants, such as that sold under the trademark SANOPREME.

Figure 5:
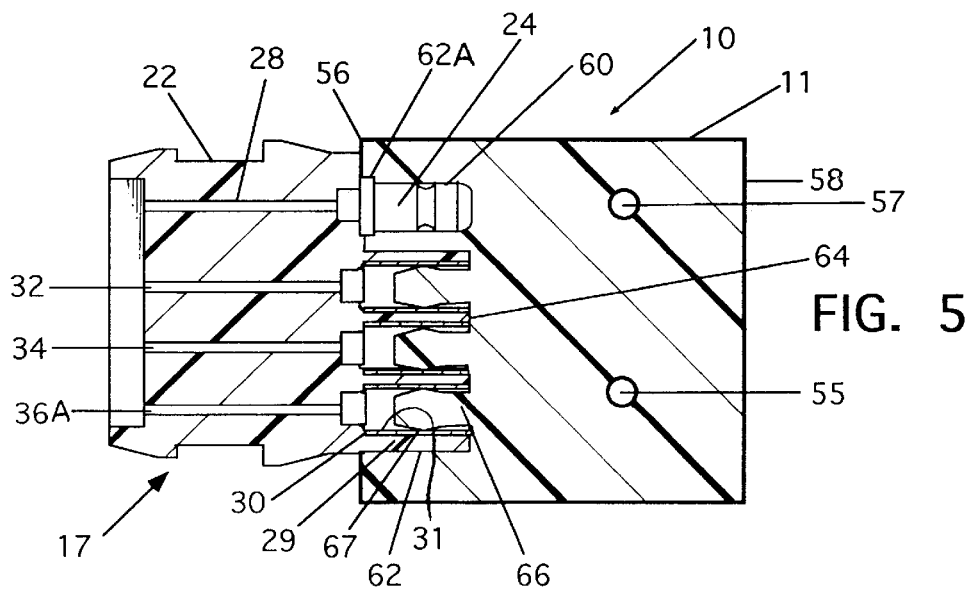
FIG. 5 is a sectional side view of the storage and protector caddy, rotated 90° relative to FIG. 3, mounted on a motor vehicle electrical power supply wiring harness illustrated in the left half of FIG. 2.
Figure 6:
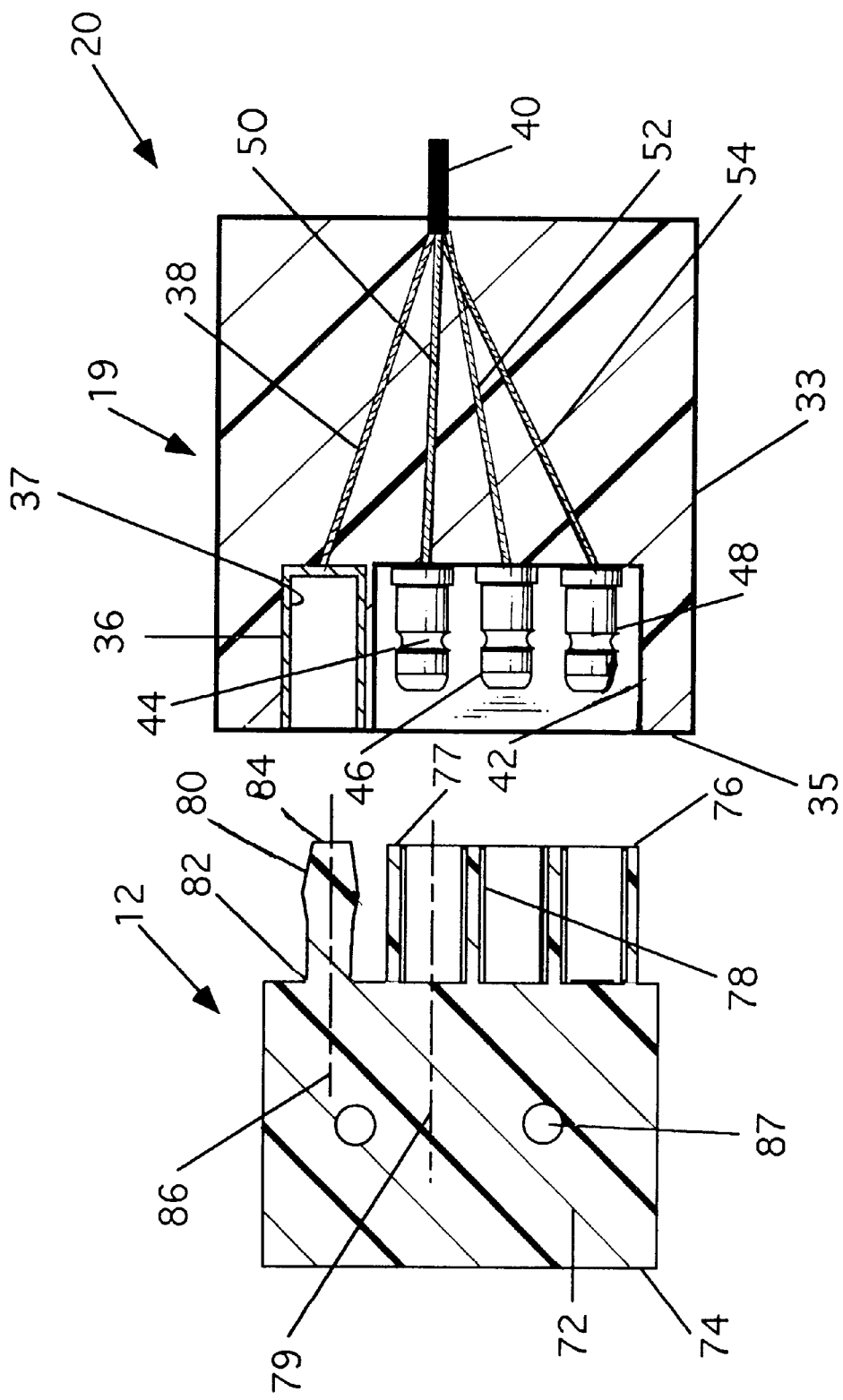
FIG. 6 is an enlarged exploded view of a storage caddy, constructed according to the present invention, for mounting on an end connector for the trailer wiring harness illustrated in the right half of FIG. 2.

The electrically nonconductive block or body 11 includes a perforate end face 56, and an imperforate end face 58. The perforate end face 56 includes a pin receiving, elongate socket, generally designated 60, having a configuration complemental to the configuration of the pin 24 so as to snugly or slidably detachably receive the male pin terminal 24 in sealing relation therewith when the body block 11 is disposed on the terminal end connector 17 as illustrated in FIG. 5. The socket 60 has an elongate axis 61 lying in a plane 70.

The perforate end face 56 also includes a second enlarged socket 62 laterally spaced from, but adjacent to, the socket 60 for receiving the plug portion 29 of connector 17 mounting the three electrically conductive cylindrical female socket terminals 30. The base 64 of the enlarged socket 62 integrally mounts three laterally spaced apart, adjacent electrically non-conductive male plug members 66 which are of such shape and configuration as to be snugly slidably received in sealing engagement with the cylindrical terminals 30 (FIG. 5). The male plug members 66 each includes a base 63 integral with the electrically nonconductive base 11 and an opposite terminal end 65 which terminates inwardly of the end face 56.

Each plug member 66 includes, between its opposite ends, a slightly enlarged, compressible integral annulus 67 which slightly compresses and seals to the cylindrical connector terminal 30 when the body on block 11 is moved to the stowing and protecting portion illustrated in FIG. 5. The male plug members 66 each include a longitudinal axis 68. The axes 68 are parallel to each other and lie in a plane 70. The terminal ends 65 of plugs 66 do not project axially outwardly beyond the end face 35. The male pin terminal 24 and each of the cylindrical female socket terminals 30 each include a longitudinal axis which lies in the plane 70 when mating with the dummy receptacle 10 as illustrated in FIG. 5.

Apertures 55 are provided in the electrically nonconductive base 11 for receiving suitable fastener bolts or the like (not shown) for attachment to the bumper 59 of the automobile 18.

The caddy 12 (FIG. 6) for the trailer harness terminal end connector 19 includes a flat rectangular solid base 72 of electrically nonconductive material having an imperforate end 74 and a perforate end 76 having an end face 77. Three elongate sockets 78 are provided in the perforate end face 77 in axial alignment with the three electrically conductive pins 44, 46 and 48 of the connector 19.

The sockets 78 are of such size, shape and configuration as to snugly slidably receive the electrically conductive pins 44, 46 and 48 so as to be in sealing engagement therewith when the caddy 12 is coupled to the terminal end connector 19.

The caddy 12 includes an integral, electrically nonconductive plug member 80, substantially identical to plug member 62A, having a base coupling end 82 integral with the base 72 and a free terminal end 84 which does not project axially outwardly beyond the end face 77. The plug member 80 includes an axis 86 which is axially aligned with the axis of elongate female socket member 36. The axes 79 of the three sockets 78 and the axis 86 of plug member 80 lie in the same plane. The dummy plug member 80 and dummy receptacles 78 and the electrically conductive socket 36 and pins 44, 46 and 48 each include a longitudinal axis which is lying in the same plane when the caddy 12 is coupled to the connector 19.

The electrically nonconductive block 72 includes apertures 87 for receiving suitable bolts or screws (not shown) for fastening to the trailer.

THE OPERATION

Figure 1:
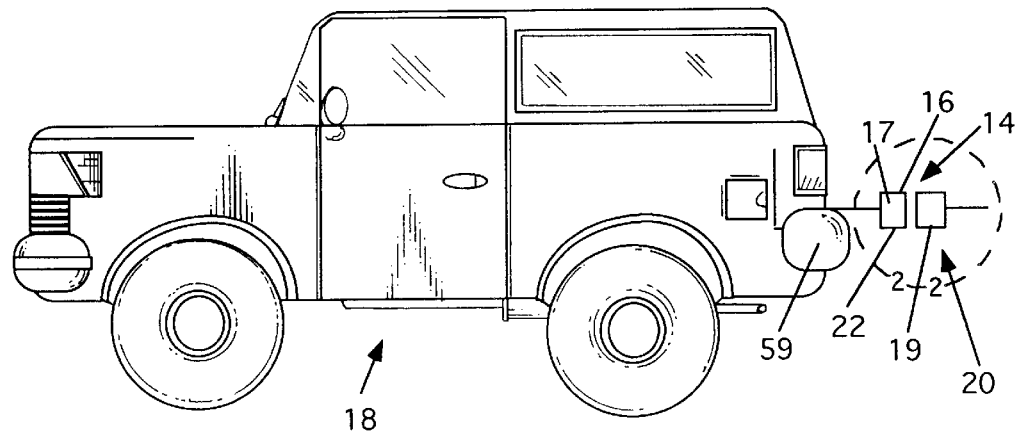
FIG. 1 is a side elevational view schematically illustrating a draft motor vehicle for drawing a trailer and cooperating mating terminal end connectors of a trailer light wiring harness adapted to be mounted on the trailer and a cooperating trailer harness coupled to a source of power on the draft motor vehicle.
Figure 2:
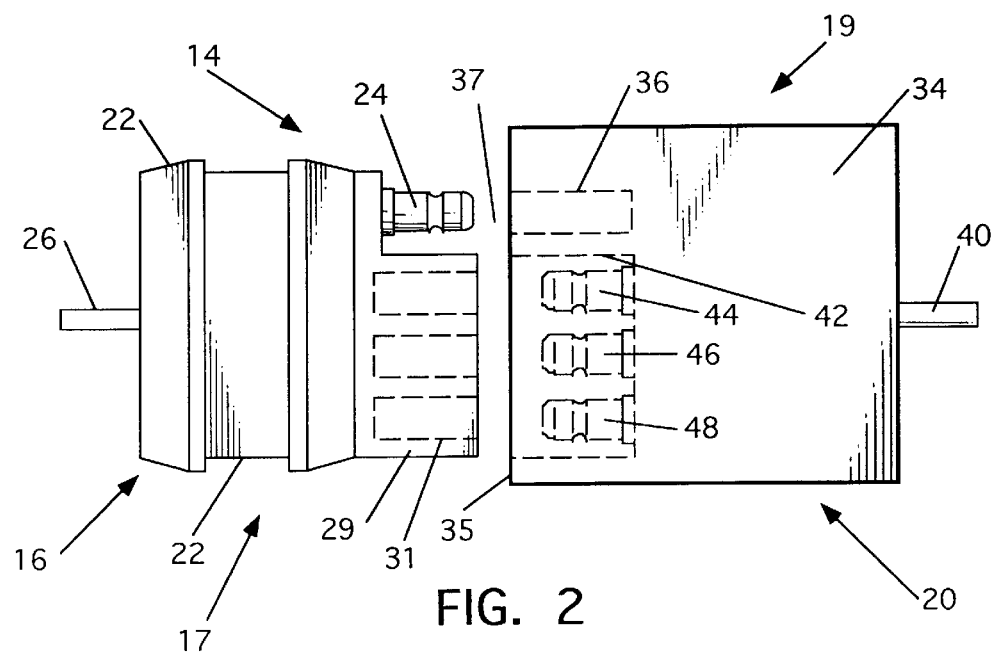
FIG. 2 is a greatly enlarged side elevational view of the wiring harness mating terminal end connectors illustrated in the chain line circle 2—2 of FIG. 1.

When it is desired to couple the power supply wiring harness 16 of the automobile to the wiring harness 20 of the trailer, the terminal end connectors 17 and 19 are moved from the remote positions illustrated in FIGS. 1 and 2 to mating positions in which the electrically conductive male plug 24 is received by the electrically conductive socket 36 and the electrically conductive, pins 44, 46 and 48 are received by the electrically conductive socket terminals 30.

When the connectors 17 and 19 are decoupled, as illustrated in FIG. 2, the storage caddy 10 is disposed on the vehicle mounted connector 17, as illustrated in FIG. 5, and the trailer caddy 12 is mounted on the trailer connector 19. The trailer caddy 12 is moved from the position illustrated in FIG. 6 to a position in which the insulated plug 80 is snugly, slidably, sealingly received in the sockets 36 and the pins 44, 46 and 48 are snugly slidably sealingly received in the insulated sockets 80.

When it is desired to again recouple the stowed connectors 17 and 19, the connectors 17 and 19 are merely axially withdrawn and detached from the caddies 10 and 12 respectively and the connectors 17 and 19 are recoupled together.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. In combination with a trailer light wiring harness having a terminal end coupling member provided with
    a plurality of laterally spaced apart, electrically conductive, elongate socket members, and
    a laterally spaced, electrically conductive, elongate male pin connector;
    a trailer light harness storage and protection caddy for storing and protecting said trailer light harness on a vehicle comprising:
        an electrically non-conductive base including an end face;
        first socket means, formed in said end face complemental to said male pin connector, disposed in said base for slidably, detachably, snugly receiving said elongate male pin connector; and
        electrically non-conductive male plug means, laterally adjacent but electrically insulated from said first socket means, integral with said base, and formed complemental to at least one of said elongate socket members, for being detachably, snugly received in said one elongate socket member;
        said male plug means having a base end integrally coupled to said base inwardly of said end face and an opposite terminal end disposed inwardly of said end face;
        means for mounting said electrically non-conductive base on a vehicle adjacent the terminal end coupling member;
        said means for mounting said electrically non-conductive base on a vehicle comprising an aperture in said base for receiving fastener means for coupling to a vehicle; and
        second socket means being formed in said end face laterally adjacent said first socket means;
        said first socket means and said second socket means being coterminous with said end face.

2. The combination set forth in claim 1 wherein said male plug means is disposed in said second socket means.

3. The combination set forth in claim 1 wherein said male plug means comprises a plurality of laterally spaced apart male plugs each having an axis lying in a predetermined plane and received in said second socket means.

4. A storage and protector caddy for stowing and protecting an electrical connector on an electrical trailer wiring harness having a terminal end provided with a cantileverly supported, elongate electrical male pin terminal and an adjacent elongate female electrical socket terminal, said storage and protector device comprising:
    a storage base of electrical nonconductive material having a perforate end with an end face and an imperforate end;
    means for mounting said storage base to a portion of a vehicle adjacent said terminal end of said electrical connector;
    male pin receiving socket means provided in said perforate end and having a shape complemental to the shape of said male pill terminal for snugly, slidably detachably receiving said male pin terminal;
    electrically nonconductive male plug means, integral with said base and disposed laterally adjacent said pin receiving socket means, having a shape complemental to the shape of said female socket terminal, for snugly, slidably being detachably received in said female electrical socket terminal;
    said means for mounting said base to the portion of the vehicle adjacent said terminal end of said electrical connector comprising an aperture in said base for receiving fastener means for coupling to the vehicle; and
    second socket means provided in said end face;
    said first and second socket means having terminal ends coterminous with said end face.

5. The storage and protector caddy set forth in claim 4 wherein said male plug means comprises a plurality of laterally spaced apart electrically non-conductive male plug members received in said second socket means;
    said male plug members each having a terminal end which does not project outwardly beyond said end face;
    said male pin receiving socket means including an elongate socket axis lying in a plane and each of said male plug means includes an elongate plug axis lying in said plane.

6. A trailer light harness protector caddy for stowing and protecting an electrical connector on a vehicle including a flat, electrically non-conductive body having a plurality of electrically conductive elongate, female conductive pin connectors embedded therein and an electrically conductive elongate male pin connector positioned laterally adjacent said female pin connectors, said female pin connectors and said male pin connector each having an elongate axis lying in a predetermined plane, said protector caddy comprising:

a block of electrically non-conductive material having a first perforate end having an end face and an opposite second imperforate end;

said perforate end including first elongate socket means, including an elongate socket axis, in said end face for sealingly detachably receiving said male pin connector;

axially outwardly projecting, integrally formed electrically non-conductive male plug means, disposed laterally adjacent said first elongate socket means, for sealingly detachably being received in one of said female pin connectors;

said male plug means including an elongate plug axis, said plug axis and said socket axis lying in said predetermined plane; and means for mounting said block of electrically non-conductive material to a portion of a vehicle adjacent an electrical connector comprising an aperture in said block of electrically non-conductive material for receiving a fastener for coupling to the vehicle.

7. A trailer light harness protector caddy for stowing and protecting a first trailer light wiring harness on a vehicle having a terminal end coupling member provided with at least one electrically conductive socket for receiving a complementally formed electrically conductive male connector on a second mating trailer light wiring harness when said first and second harnesses are mated, and an electrically conductive male pin for detachably mating with a complementally formed electrically conductive female receptacle on said second harness when said first and second harnesses are mated, said protector caddy comprising:

a one-piece block of electrically non-conductive material having a perforate end; and an imperforate end;

said perforate end having an end face, a first electrically non-conductive socket in said end face for detachably sealingly receiving said conductive male pin when said first harness and said protector caddy are mated, and a second electrically non-conductive socket in said end face;

said first socket having an inner end terminating intermediate said perforate and imperforate ends and an outer end terminating at said end face;

said second socket having an inner end terminating intermediate said perforate and imperforate ends and an outer end terminating at said end face;

said block including an integral, electrically non-conductive male plug received by said second electrically non-conductive socket for sealingly detachably being received in said electrically conductive socket, said male plug having an outer terminal end which does not project outwardly beyond said end face; and means for mounting said block of electrically non-conducting material to a portion of a vehicle adjacent said terminal end coupling member comprising an aperture in said block for receiving a fastener for coupling to the vehicle.

\* \* \* \* \*